April 29, 1947. O. JACOBSEN 2,419,647
PLUG VALVE
Filed Nov. 24, 1943
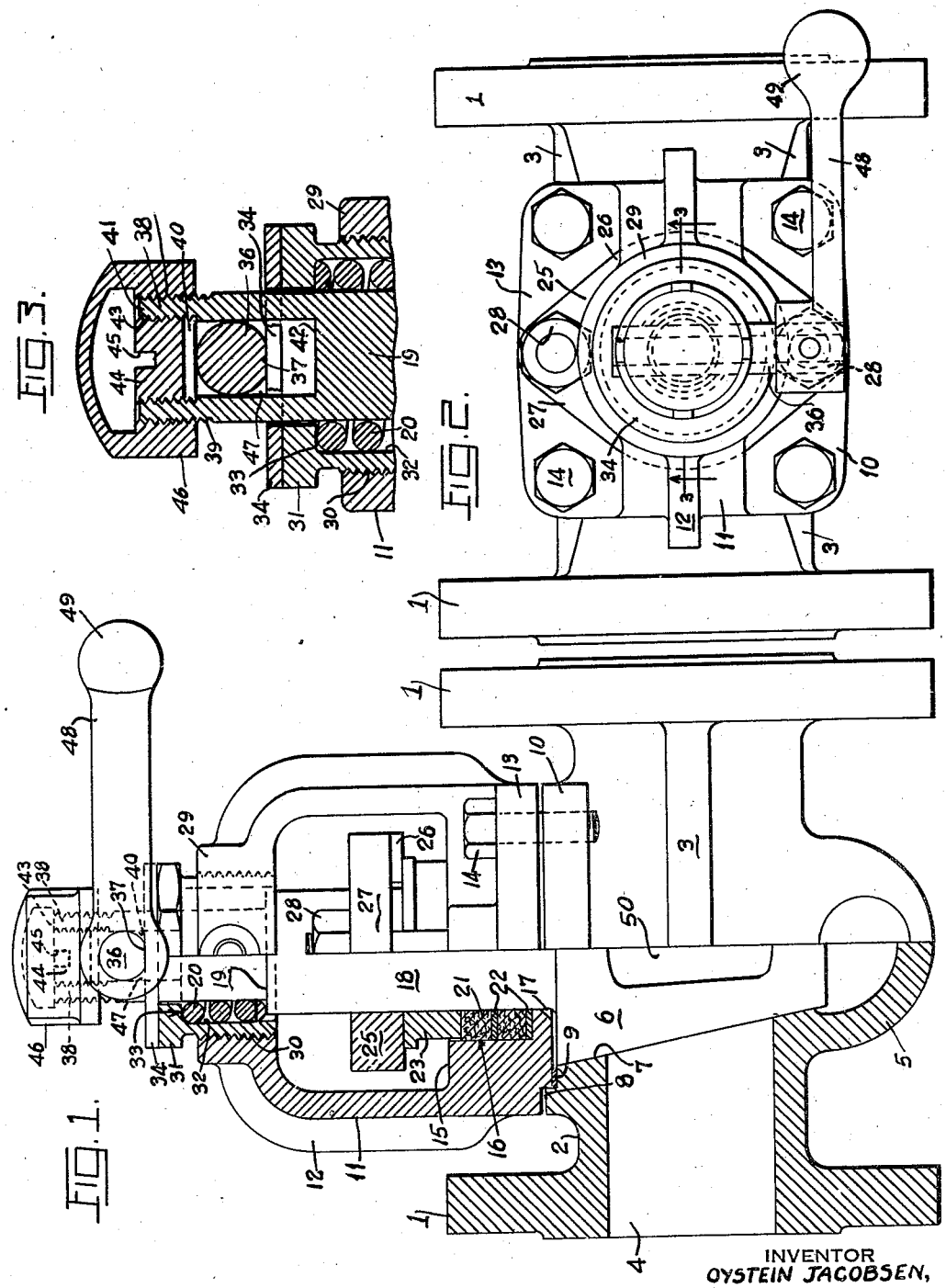
INVENTOR
OYSTEIN JACOBSEN,
BY
Toulmin & Toulmin.
ATTORNEYS Patented Apr. 29, 1947

2,419,647

UNITED STATES PATENT OFFICE 2,419,647

PLUG VALVE

Oystein Jacobsen, Montgomery County, Ohio, assignor to The Duriron Company, Inc., Dayton, Ohio, a corporation of New York Application November 24, 1943, Serial No. 511,518

5 Claims. (Cl. 251—97)

The present invention relates to valves for controlling the flow of liquids and more particularly to those valves of the mechanical lift plug cock type.

The plug cock type of valve has been satisfactory in operation especially in small installations but when this type is used in connection with valves for controlling large quantities of fluid which flows at relatively high pressure, thus necessitating rotating parts of considerable weight, some difficulty may be encountered in operating the valve. Due to this excessive weight, the plug may adhere tenaciously to its seat, particularly when the valve is left either in the open or in the closed position for any length of time and it may take a considerable effort, usually exerted by hand, to open or close the valve. This freezing effect is often enhanced by reason of the character of the liquid that is being controlled, for example, in the case of acid-containing liquids, the acid may attack parts of the valve, including the bearing surfaces to form a precipitate or at least to cause roughening of the surfaces sufficient to present considerable resistance to rotation.

Many expedients have been proposed to "loosen up" a plug valve under these circumstances and perhaps one of the most recent is the use of a heavy grease which is introduced into the lower part of the valve body just below the plug valve under pressure tending momentarily to lift the plug and simultaneously to lubricate the bearing surfaces. This pressure is usually applied by means of a piston arrangement conveniently in the form of a set screw so that as the screw is turned inwardly toward the body, greater pressure is applied hydrostatically to the lubricant. While this arrangement has operated satisfactorily in a general way, it is open to the objections that the pressure applied to the lubricant by the set screw is difficult to determine or measure so that the lifting effect on the valve cannot be accurately predetermined, and secondly, no leakage in the reservoir which contains the lubricant can be permitted since otherwise it may be difficult to apply and maintain any given pressure within the lubricant.

In case there is a severe attack of corrosion as when for example, acid-containing fluid is being controlled and the valve is left in one of its two positions for a considerable period of time, the freezing effect at the bearing surfaces becomes considerable and sometimes will not yield to any pressure exerted on the lubricant. In such an event, it becomes necessary completely to dismantle the coupling valve and to press the plug out of its seat.

The primary object of the present invention is to provide an improved plug cock valve with an inexpensive and effective mechanism by which the plug can be first lifted through a predetermined distance sufficient to break the seal and later turned to the open or closed valve position depending on the direction in which the valve is to be operated.

Another object is to provide a plug valve in which the plug lifting and turning mechanism is constituted of a device forming part of the valve structure.

Still another object is to provide as an alternative modification a lifting and turning mechanism which employs a simple wrench for each of its lifting and turning operations.

These objects are attained in brief by providing a lifting mechanism of the positive type, i. e. without any dependence on the use of hydrostatic pressure and employing the same mechanism for operating the valve between its open and closed positions, and while still using the same mechanism to cause the plug to be returned to its seat on having reached its final open or closed position.

The invention will be better understood when reference is made to the following description and the accompanying drawings in which:

Figure 1 represents an elevational view partly in section of the improved plug valve including the lifting mechanism.

Figure 2 is a plan view of the combined valve and lifting mechanism shown in Figure 1, while Figure 3 is a sectional view taken along line 3—3 in Figure 2, but of an enlarged size.

Referring to Figures 1, 2 and 3, reference character 1 represents the end flange portions of a coupling body 2. Strengthening ribs 3 may extend between the two flanges. An opening 4 preferably of circular configuration extends longitudinally through the body. The latter may be provided with a downwardly extending portion 5 which constitutes a sump for the grease or oil which normally is introduced between the plug valve 6 and its seat 7. The latter may take the form of a vertically positioned opening of conical shape, centrally disposed with respect to the coupling body 2 and therefore communicating with the longitudinal opening 4. The plug 6 is of a conical shape and fits snugly but slidably within the conically shaped opening or seat 7.

The upper part of the body 2 is provided with a flat shouldered portion indicated at 8 and there is a gasket 9 fitted against the shoulder to prevent leakage. The shouldered portion 8 merges into a relatively large rectangularly shaped member 10 which extends flatwise across the upper surface of the valve body as can be seen in Figure 2.

Resting on the gasket 9 there is a relatively heavy bonnet member 11 provided with upstanding ribs 12 and terminating at the bottom in a rectangularly shaped metal plate 13 (Figure 2) of approximately the same size as the plate 10. Four bolts 14 may be provided at the corners of the plates 13, 10 in order to secure these members together. The bonnet 11 is also provided at the lower end with a circular portion 15 in which is provided a shouldered recess to leave a centrally disposed opening 16 which extends to the bottom of the bonnet. This opening slidably receives an upstanding shaft 18 preferably formed integral with the plug 6 and this shaft in turn is provided with a shouldered portion 19 for receiving a compression spring 20.

The annular compartment formed between the recess 16 and the shaft 18 contains two sections of packing material 21 separated from one another and also from the bottom of the recess by spacing washers 22. In order to apply pressure to the upper layer of packing material a circular gland member 23 may be employed. A circular plate 25 having ribs 26 rests on the gland member, this plate being provided with a pair of oppositely disposed wing portions 27. Bolts 28 pass through the wings into the plate 13 so that by tightening the bolts, pressure may be applied through the ribs 26 to the gland 23 against the packing sections 21.

The bonnet 11 terminates at the top in a cylindrical portion 29 which has a threaded bore 30 at a position directly opposite from the shoulder 19 on the shaft 18. These threads engage a hollow screw member 31 provided with an interiorly positioned recess 32 for containing the spring 20. The latter bears against the shoulder on the shaft 18 at one end and at the upper end is confined by a shoulder 33 formed within the screw member 31. The upper surface or the screw member 31 is entirely flat and supports a washer 34. This washer serves as a bearing surface for the cam 36 and therefore preferably has a hardened surface. The cam may comprise a laterally extending cylindrical rod having a flattened surface indicated at 37 at its underside and held in horizontal position between two uprights of arcuate or partially circular configuration. These uprights may be conveniently provided from extensions of the shouldered portion 19 of the shaft 18 which extends upwardly through an opening provided adjacent the shoulder 33 of the screw member 31. The upper end of the shaft 19 may be threaded as indicated at 39, and there is a counterbored opening indicated at 40 extending from the upper end of the shaft indicated at 41 to a position indicated at 42 approximately in line with the lower surface of the shoulder 33. This counterbore is threaded as indicated at 43 to receive a nut 44 provided with a screw driver slot 45. The threads 39 which are on the outside surface of the shaft 19 receive a cap nut 46. The counterbored end of the shaft 19 may be provided with a relatively wide vertical slot indicated at 47 of a dimension as fairly snugly to fit the cam rod 36.

The shaft bears along its flat surface against the washer 34 on the screw member 31 and is confined at each side by the vertical slot formed in the shaft 19 and at the top bears against the underside surface of the nut 46.

Consequently, any rotation of the rod 36 will cause the circular portion of the rod to displace the flat portion at the bearing surface 34 and to cause a lifting effect on the nut 46 which is secured to the shaft 19. In order to rotate the rod 36 conveniently a lever 48 may be secured thereto in any suitable manner, i. e. by pinning or by a key, this lever terminating in a hand knob 49. The nut 44 serves to re-inforce the columns 38 which are formed out of the shaft 19 since it prevents any movement inwardly of these two upstanding segmental projections. On the other hand, the nut 46 prevents any outward movement of the two columns 38 so that the combination of the two nuts maintains the columns 38 in a rigid position.

In operation the spring 20 is inserted in position under compressional stress and its function is to force the plug 6 into its seated position. It has been pointed out that in a plug valve of this character, particularly when handling liquids which contain precipitates or are of a corrosive character, tend to freeze or to stick to its seat due to the formations of precipitates or other friction engendering effects. The tendency of the valve to remain in its last position is still further enhanced if the valve had been left in that position for any appreciable length of time. It therefore becomes very difficult to turn the valve, for example from its closed valve position as indicated in Figure 1 to its valve open position in which the opening 50 is moved into alignment with the opening 4. Under such circumstances and in accordance with my invention, it is necessary merely to turn the lever 48 in a clockwise or counterclockwise direction through a distance sufficient to obtain a camming effect at the upper surface of the rails 34 and thus to raise the plug 6 a distance from its seat as will break the seal. Usually, the lever 48 need be rotated less than 45° depending on the shape and position of the cam surface 37 with respect to its washer bearing surface so that the lever 48 still remains in an extended position from the central axis of the valve. While in this position, the lever 48 can then be swung in the horizontal direction so as to turn the shaft 19 of the plug valve 6 through any desired angle until the opening 50 in the plug comes into alignment with the opening 4 in the valve body. This position represents valve open conditions.

When the valve has been moved from its valve closed to its valve open position as indicated, the hand may be removed from the lever 48 whereupon the compression in the spring 20 is sufficient to force the shoulder of the shaft 18 downwardly and thus to seat the valve in its new position. If the spring 20 can exercise sufficient force the handle 48 will return to its horizontal position although it will be understood that if desired, and depending on the shape of the cam 36, it may be necessary manually to return the lever to its initial position.

The same operation can be performed when it is desired to move the valve from its valve open to its valve closed position by simply again rotating the lever 48 in either direction to lift the plug from its seat due to the camming effect at the rod 36 and while in this position to move the lever 48 in a horizontal direction to bring about a valve closed condition.

It is apparent that none of the fluid passing through the openings 4 and 50 can find its way to the lifting mechanism because such fluid would be intercepted or obstructed by the presence of the packing rings 21. The latter may be given greater amounts of compression and therefore radial expansion and have its leakage preventing properties increased by simply tightening the bolts 28 to force the gland 23 further down into the annular recess 16.

In addition to constituting a convenient and highly effective manner of unfreezing the plug 6 at its seat and thereafter rotating the plug, the improved structure provides the further advantage in that all of the mechanism required to perform these useful results constitutes an integral part of the improved structure so that it is always available for operation. No accessory is necessary other than that which is provided on and forms part of the lifting and rotating mechanism. It will also be noted that the design is of a simplified character in that it requires only a relatively few parts and these parts are readily open to inspection and replacement by simply removing the nuts 44, 46 and the screw member 31. There is nothing particularly critical about the dimensions of the various parts except for the position and size of the flattened surface 37 and any wear at the camming surface or at the upper part of the cam rod 36 may be readily taken up by simply rotating the nut 46 until its lower surface makes contact with the rod 26.

While I have explained my invention from the standpoint of providing a positive lifting effect on the valve plug, by the cam structure it is evident that if desired, the action may be supplemented by the use of hydrostatic pressure applied to the lower end of the plug 6 through a lubricating medium. It is apparent that the lifting forces that may be obtained through the use of the cam-operated lever are so large as to defy any permanent freezing action between the plug 6 and its seat. This is of considerable advantage in case the valve is controlling fluids of a corrosive character such as acid-containing liquids which may cause the precipitation and deposition of solid material between the valve and its seat and which eventually may harden to produce strong adhering effects.

The effectiveness of my improved valve lifting mechanism is so great that any seal which tends to build up between the plug and its seat can be instantly broken and without damage to the plug even if the latter were to remain in its valve on or valve off positions for any long lengths of time.

It will be understood that I desire to comprehend within my invention such modifications as come within the scope of the claims and the invention.

Having thus fully described my invention, what I claim as new and desire to secure by Letters Patent is:

1. A valve for controlling the flow of fluid through a pipe coupling, said coupling being provided with a main passageway and an angularly positioned bore communicating therewith, a plug valve within said bore adapted to rotate, a passageway extending laterally through said plug and adapted to register with the coupling passageway when the plug is rotated, means for lifting the plug away from its seat, said means including a shaft extension on the plug with a longitudinal slot therethrough to leave a pair of spaced upstanding arcuate portions, said portions being threaded exteriorly and interiorly to receive a pair of concentrically arranged nuts, a cam shaft extending between said arcuate portions of the shaft and adapted to contact the underside of the outer of said concentric nuts, a bonnet structure secured to said coupling and surrounding said shaft, said structure terminating in a flat upper surface and said cam shaft being adapted to bear against the upper surface of said bonnet structure whereby when said cam shaft is rotated the cam surface will force the outer nut member away from the upper surface of the bonnet structure to raise the shaft and its integrally connected plug away from the valve seat.

2. A valve for controlling the flow of fluid through a pipe coupling, said coupling being provided with a main passageway and an angularly positioned bore communicating therewith, a plug valve within said bore adapted to rotate, a passageway extending laterally through said plug and adapted to register with the coupling passageway when the plug is rotated, means for lifting the plug away from its seat, said means including a shaft extension on the plug with a longitudinal slot therethrough to leave a pair of spaced upstanding arcuate portions, said portions being threaded exteriorly and interiorly to receive a pair of concentrically arranged nuts, a cam shaft extending between said arcuate portions of the shaft and adapted to contact the underside of the outer of said concentric nuts, a bonnet structure secured to said coupling and surrounding said shaft, said structure terminating in a flat upper surface and said cam shaft being adapted to bear against the upper surface of said bonnet structure whereby when said cam shaft is rotated the cam surface will force the outer nut member away from the upper surface of the bonnet structure to raise the shaft and its integrally connected plug away from the valve seat, and means for restoring the valve plug to its seat when the cam shaft has been moved to its initial position, said means including a compression spring which bears at one end against a shoulder provided on said shaft and at the other end against said bonnet structure.

3. A valve for controlling the flow of fluid through a pipe coupling, said coupling being provided with a main passageway and an angularly positioned bore communicating therewith, a plug valve within said bore adapted to rotate, a passageway extending laterally through said plug and adapted to register with the coupling passageway when the plug is rotated, means for lifting the plug away from its seat, said means including a shaft extension on the plug with a longitudinal slot therethrough to leave a pair of spaced upstanding arcuate portions, said portions being threaded exteriorly to receive a nut, a cam shaft extending between said arcuate portions of the shaft and adapted to contact the underside surface of said nut, a bonnet structure secured to said coupling and surrounding said shaft, said cam shaft being adapted to bear against the upper surface of the bonnet structure whereby when the cam shaft is rotated the cam surface will force said nut member away from the upper surface of the bonnet structure to raise the shaft and its connected plug away from the valve seat.

4. A valve for controlling the flow of fluid through a pipe coupling, said coupling being provided with a main passageway and an angularly positioned bore communicating therewith, a plug valve within said bore adapted to rotate, a passageway extending laterally through said plug and adapted to register with the coupling passageway when the plug is rotated, a bonnet carried by said coupling, said plug being provided with an upstanding shouldered stem contained within said bonnet, said bonnet being of sufficient size to leave an annular space between the bonnet and the shouldered portion of the stem, a member in said space adjustably connected to said bonnet and provided with a shouldered recess, a compression spring in said recess adapted to bear at one end against said shoulder and at the other end against said member in order to force the plug into its seat, and means for lifting the plug away from its seat preparatory to rotating the plug between its valve open and valve closed positions, said means including a cam operated device actuated by a lever, said spring serving to urge the plug against the seat after the cam has been moved to its initial position.

5. A valve for controlling the flow of fluid through a pipe coupling, said coupling being provided with a main passageway and an angularly positioned bore communicating therewith, a plug valve within said bore adapted to rotate, a passageway extending laterally through said plug and adapted to register with the coupling passageway when the plug is rotated, a bonnet carried by said coupling, said plug being provided with a shouldered shaft contained within said bonnet, said bonnet being of sufficient size to leave an annular space between the bonnet and the shouldered shaft, a member in said space adjustably connected to said bonnet and provided with a shouldered recess, a compression spring within the recess adapted to bear at one end against said shoulder and at the other end against said bonnet in order to force the plug into its seat, means for lifting the plug away from its seat against the action of said spring and preparatory to rotating the plug between its valve open and valve closed positions, said spring serving to force the plug into its seat when said lifting means is rendered inoperative.

OYSTEIN JACOBSEN.

REFERENCES CITED

The following references are of record in the file of this patent:

UNITED STATES PATENTS

| Number | Name | Date |
|---|---|---|
| 1,483,508 | Brunner | Feb. 12, 1924 |
| 1,910,947 | Coffman | May 23, 1933 |
| 2,005,128 | Bowes | June 18, 1935 |
| 2,142,795 | McFarlane | Jan. 3, 1939 |
| 2,237,020 | Wilson | Apr. 1, 1941 |
| 1,891,759 | Flodin | Dec. 20, 1932 |

FOREIGN PATENTS

| Number | Country | Date |
|---|---|---|
| 244,017 | Britain | Dec. 10, 1925 |
| 88,855 | Sweden | Jan. 21, 1937 |
| 352,228 | Britain | July 9, 1931 |
| 683,662 | Germany | Nov. 11, 1939 |